(12) United States Patent
Muir

(10) Patent No.: US 8,769,407 B2
(45) Date of Patent: Jul. 1, 2014

(54) POINTING HELP SYSTEM

(75) Inventor: David J. Muir, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 1813 days.

(21) Appl. No.: 11/831,660

(22) Filed: Jul. 31, 2007

(65) Prior Publication Data

US 2009/0037815 A1 Feb. 5, 2009

(51) Int. Cl.
*G06F 3/01* (2006.01)
(52) U.S. Cl.
USPC .......................................... 715/705; 715/711
(58) Field of Classification Search
USPC .................................... 715/705, 711
See application file for complete search history.

(56) References Cited

U.S. PATENT DOCUMENTS

| | | | | |
|---|---|---|---|---|
| 6,717,589 | B1 * | 4/2004 | Grillo et al. | 715/715 |
| 7,346,846 | B2 * | 3/2008 | Rossi et al. | 715/705 |
| 2006/0080607 | A1 * | 4/2006 | Cohen et al. | 715/705 |
| 2007/0266324 | A1 * | 11/2007 | Chailleux | 715/730 |

* cited by examiner

*Primary Examiner* — Andrea Leggett
(74) *Attorney, Agent, or Firm* — Steven M. Greenberg, Esq.; CRGO Law

(57) ABSTRACT

Embodiments of the present invention address deficiencies of the art in respect to the help function and provide a method, system and computer program product for a pointing help system. In one embodiment of the invention, a method for pointing help in a GUI can include receiving a help event in association with a GUI control in the GUI, generating a help message for placement in a portion of the GUI statically configured to present different help messages, and visually coupling the GUI control with the help message through pointing help. In particular, in one aspect of the embodiment, visually coupling the GUI control with the help message through pointing help can include generating an arrow shell in a window separate from the GUI; and superimposing the arrow shell over the GUI to visually couple the GUI control with the help message.

18 Claims, 2 Drawing Sheets

US 8,769,407 B2

POINTING HELP SYSTEM

BACKGROUND OF THE INVENTION

1. Field of the Invention

The present invention relates to the field of the computer user interface and more particularly to help systems for a computer user interface.

2. Description of the Related Art

The conventional graphical user interface (GUI) has been widely used for many years. The primary function of the GUI includes providing visual controls with which the end-user can interact with an underlying application. Though the common GUI includes many stock visual controls, a select few visual controls can be combined to accommodate most computer-human interactions required by an application. For example, the static text box control can be used to present text to the end-user while an edit box can permit the user to provide textual input to the application. A radio button control can provide for the exclusive selection of an element from among a field of elements, while a checklist box can control can provide for the non-exclusive selection of elements from among a field of elements.

The help function associated with a software application ordinarily entails accepting an indication of required assistance and presenting a message to a requestor intended to help the requester. Advanced forms of the help function provide contextual messages depending upon a contemporaraneous activity of the requester sensed by the help function. The modern GUI enables dramatic improvements in the operation of the help function. In this regard, different combinations of GUI controls within a GUI can be arranged to present user-friendly help in the context of contemporary end user activity.

The modern GUI has become complex in nature and often includes a substantial number of GUI elements within a small display space. The problem of limited display space can be compounded in the smallish display of a personal digital assistant or other pervasive device. To provide a help portion of the GUI in different locations at different times can become confusing to the end user who often does not know where to expect the presentation of help within the GUI. In consequence, within a complex GUI environment, help can be localized to a specific portion of the GUI screen, for example a status bar at the bottom of the GUI display.

Placing help at the bottom of the GUI display is not without consequence. In particular, where help is rendered in connection with a particular GUI control in a GUI display, the context of the help will be self-evident. Isolating help in a statically defined portion of the GUI display decouples the context of the help from that portion of the GUI display most relevant to the help. Accordingly, one must choose between a predictable location for help in a GUI environment, and a contextually relevant presentation of help messages in the GUI environment.

BRIEF SUMMARY OF THE INVENTION

Embodiments of the present invention address deficiencies of the art in respect to the help function and provide a novel and non-obvious method, system and computer program product for a pointing help system. In one embodiment of the invention, a method for pointing help in a GUI can include receiving a help event in association with a GUI control in the GUI, generating a help message for placement in a portion of the GUI statically configured to present different help messages, and visually coupling the GUI control with the help message through pointing help. In particular, in one aspect of the embodiment, visually coupling the GUI control with the help message through pointing help can include generating an arrow shell in a window separate from the GUI; and superimposing the arrow shell over the GUI to visually couple the GUI control with the help message.

In another aspect of the embodiment, visually coupling the GUI control with the help message through pointing help can include determining a different GUI control impacted by a change of state for the GUI control associated with the help event and visually coupling the different GUI control with the GUI control associated with the help event through pointing help. Further, in yet another aspect of the embodiment, the method can include further determining yet another GUI control in the GUI impacted by a change of state in the different GUI control, and visually coupling the yet another GUI control with the different GUI control through pointing help.

In another embodiment of the invention, a computer data processing system can be configured for pointing help in a supported GUI. The system can include an application GUI provided by an application executing in a host computing platform, multiple different GUI controls, and pointing help in a separate window superimposed over the application GUI. The pointing help can be an arrow shell and can visually couple a selected one of the GUI controls to a statically positioned help message in the application GUI. Alternatively, the pointing help can visually couple the selected one of the GUI controls with another of the GUI controls impacted by a state change in the selected one of the GUI controls.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for pointing help. In accordance with an embodiment of the present invention, a request for help can be received in connection with two different GUI controls in a GUI for an application. In response, the GUI controls can be visually coupled to one another with a pointing help control, for example an arrow shell. The arrow shell can be superimposed on the GUI while remaining separate from the GUI to allow an arc of the arrow shell to exceed boundaries defined for the GUI. In one aspect of the embodiment, one of the GUI controls can be a help message, though in another aspect of the embodiment, the GUI controls can be GUI controls having content causally related to one another.

Figure 1A:
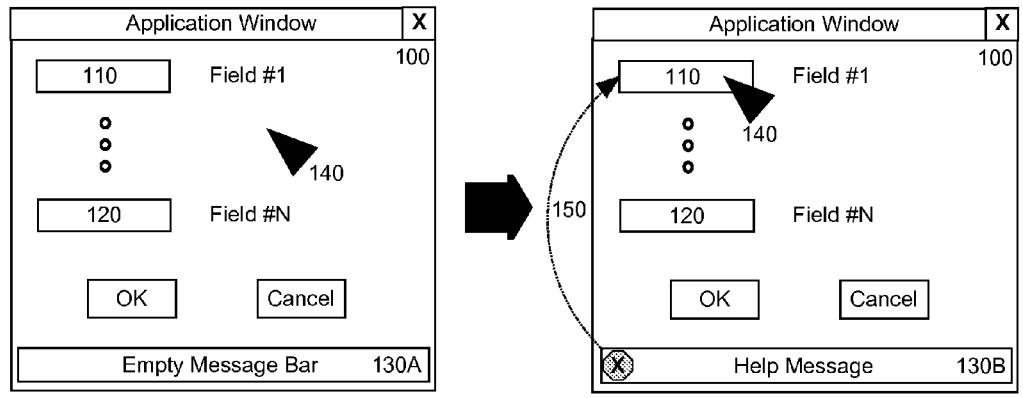
FIGS. 1A and 1B, taken together, are a pictorial illustration of a system, method and computer program product for pointing help.
Figure 1B:
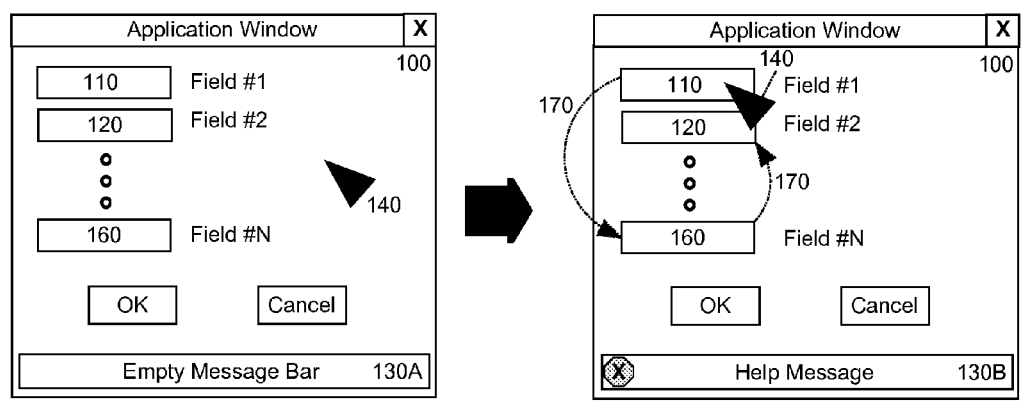

In further illustration, FIGS. 1A and 1B, taken together, are a pictorial illustration of a system, method and computer program product for pointing help. In FIG. 1A, an application GUI 100 is shown. The application GUI 100 can include GUI controls 110, 120 through which an end user can interact with an underlying application for the application GUI 100. Pointing icon 140 can navigate the application GUI 100 and the position of the pointing icon 140 can be detected when in proximity of one or more of the GUI controls 110, 120. Finally, a help message bar 130A can be provided in a fixed portion of the application GUI 100 through which help messages can be provided in the context of an interaction between an end user and the GUI controls 110, 120 of the application GUI 100.

Notably, a help event can be detected in association with a GUI control 110. The help event can arise in the form of a proximity event such as a mouse over performed by pointing icon 140, or a selection event, such as a caret insertion or mouse down event performed by pointing icon 140, or even a help keystroke event resulting from the striking of a keyboard key associated with help—commonly "F1". Other help events may be system-generated help events, meaning that the events arise independently of, or only indirectly from, user actions. Examples of system-generated help events include error messages, state changes within a program represented by the application GUI 100, and receipt of information from a source external to the program represented by the application GUI 100. In response to detecting the help request in association with the GUI control 110, a suitable help message 130B can be provided in the help message bar 130A. Additionally, pointing help control 150, for example an arrow shell as shown in FIG. 1A can be provided in order to visually couple the GUI control 110 associated with the help message 130B. In this way, a visual relationship can be readily identified between the help message 130B and the associated GUI control 110.

As shown in FIG. 1A, the pointing help control 150 can be a user interface element managed separately from the application GUI 100 so as to permit the pointing help control 150 to exceed the bounds of the application GUI 100—particularly where the pointing help control 150 is an arrow shell where the arc of the arrow shell is to arc outside of the bounds of the application GUI 100. Notably, the pointing help control 150 not only can provide a visually coupling between a GUI control 110 and a corresponding help message 130B, but also the pointing help control 150 can provide a visual coupling between two or more of the GUI controls 110, 120 where the actions taken by an end user with respect to one of the GUI controls 110, 120 affects the state of another of the GUI controls 110, 120.

Specifically, in reference to FIG. 1B a state change in one of the GUI controls 110, 120, 160 can set off a cascading impact amongst others of the GUI controls 110, 120, 160. Consequently, as shown in FIG. 1B, when a help event is detected in association with a state change in one of the GUI controls 110, 120, 160 a pointing help control 170 can be provided to visually couple cascading ones of the GUI controls 110, 120, 160 impacted by the state change. For example, as shown in FIG. 1B, the pointing help control 170 can be used to indicate the impact on GUI control 160 based upon a change in GUI control 120 which results from a change in GUI control 110.

Figure 2:
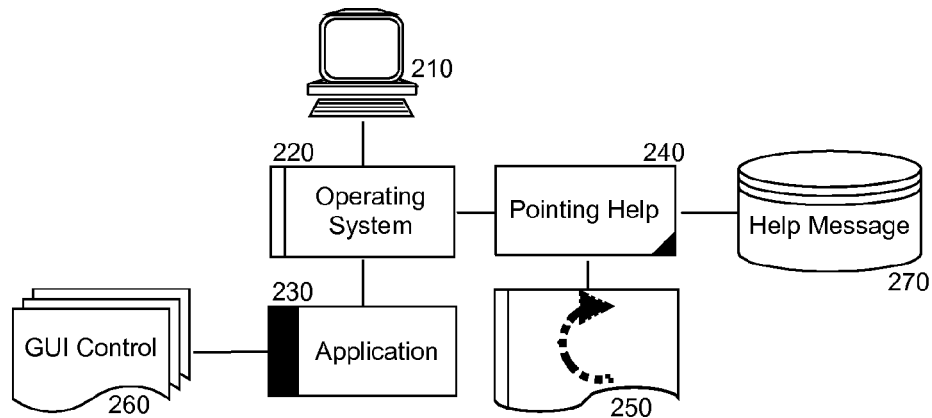
FIG. 2 is a schematic illustration of a computer data processing system configured for pointing help; and, FIG. 3 is a flow chart illustrating a process for pointing help in the computer data processing system of FIG. 2.

The process shown in FIGS. 1A and 1B can be performed within a computer data processing system. In illustration, FIG. 2 schematically depicts a computer data processing system configured for pointing help. The system can include a host computing platform 210 supporting operating system 220. The operating system 220 can host the execution of an application 230 providing an application GUI including one or more GUI controls 260. Pointing help 240 can be coupled to the operating system 220. The pointing help 240 can include program code enabled to provide help messages 270 in association with user interactions with corresponding ones of the GUI controls 260. Notably, the program code of the pointing help 240 can further be enabled to paint pointing help such as an arrow shell 250 between an individually provided one of the help messages 270 and a corresponding one of the GUI controls 260.

In this regard, an arrow shell 250 can be constructed as a separate window from the application GUI and proportioned in size and positioned to indicate a visual coupling between an affected one of the GUI controls 260 and a corresponding one of the help messages 270. Alternatively, the arrow shell 250 can be constructed as a separate window from the application GUI and proportioned in size and positioned to indicate a visual coupling between an affected one of the GUI controls 260 and one or more other of the GUI controls 260 impacted by a stated change in the affected one of the GUI controls 260. In this way, an end user viewing the overlaying of the arrow shell 250 on the application GUI can deduce an effect imparted by a state change in one of the GUI controls 260 on another of the GUI controls 260.

Figure 3:
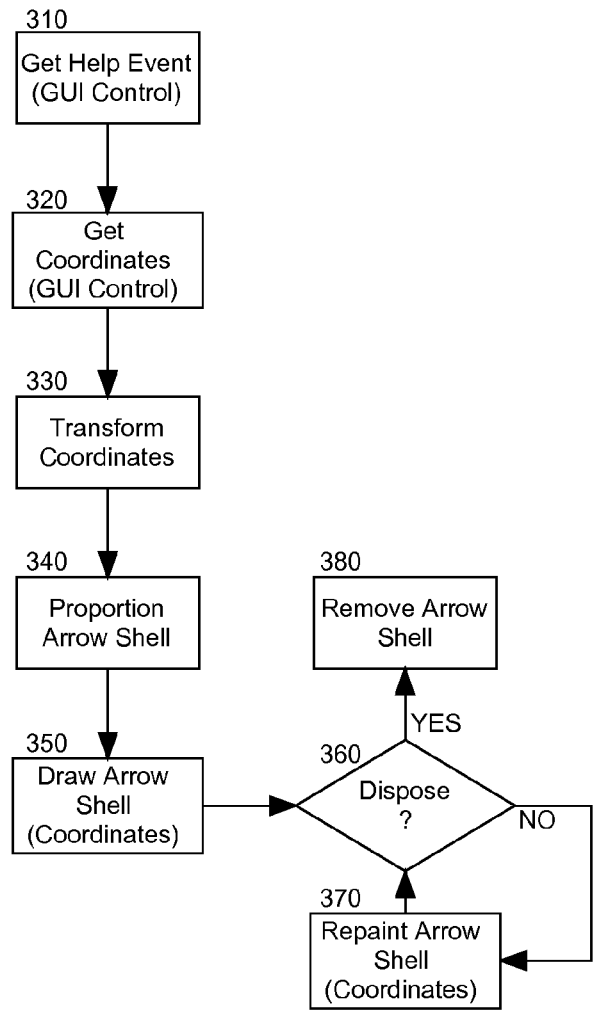

In yet further illustration, FIG. 3 is a flow chart illustrating a process for pointing help in the computer data processing system of FIG. 2. Beginning in block 310, a help event can be detected for a GUI control in a GUI application. In block 320, the coordinates of the GUI control in the GUI application can be determined and in block 330 the coordinates can be transformed relative to the operating environment. In block 340, an arrow shell can be proportioned according to the transformed coordinates to overlay the arrow shell between the GUI control and a help message (or an affected other GUI control). Thereafter, in block 350 the arrow shell can be drawn superimposed over the GUI application window to define a visual coupling between the GUI control and the help message (or affected other GUI control).

In decision block 360, it can be determined whether or not to dispose of the arrow shell as the help event terminates in connection with the GUI control. If not, the arrow shell can be repainted in association with the transformed coordinates in block 370. When it is determined to dispose of the arrow shell, in block 380 the arrow shell can be removed from superimposition in respect to the application GUI.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for pointing help in a graphical user interface (GUI), the method comprising:
    receiving a help event in association with a GUI control in the GUI rendered for an application executing in a computer with at least one processor and memory;
    generating a help message for placement in a portion of the GUI statically configured to present different help messages; and,
    visually coupling the GUI control with the help message through pointing help visually rendered in the GUI separately from the help message and the GUI control and comprising an image in the form of an arrow;
    wherein receiving a help event in association with a GUI control in the GUI, comprises receiving a help event selected from the group consisting of a mouse over event, a mouse down event, selection event, caret insertion event, and a help keystroke event.

2. The method of claim 1, wherein receiving a help event in association with a GUI control in the GUI, comprises receiving a system-generated help event.

3. The method of claim 1, wherein generating a help message for placement in a portion of the GUI statically configured to present different help messages, comprises generating a help message for placement in a message bar portion of the GUI statically configured to present all help messages for the GUI.

4. The method of claim 3, wherein superimposing the arrow shell over the GUI to visually couple the GUI control with the help message, comprises superimposing the arrow shell over the GUI to visually couple the GUI control with the help message with an arc of the arrow shell exceeding bounds for the GUI while remaining within a display area for a device displaying the GUI.

5. The method of claim 4, wherein superimposing the arrow shell over the GUI to visually couple the GUI control with the help message, comprises superimposing the arrow shell over the GUI to visually couple the GUI control with the help message with an arc of the arrow shell being within bounds for the GUI.

6. The method of claim 1, wherein visually coupling the GUI control with the help message through pointing help, comprises:
    generating an arrow shell in a window separate from the GUI; and,
    superimposing the arrow shell over the GUI to visually couple the GUI control with the help message.

7. The method of claim 1, wherein visually coupling the GUI control with the help message through pointing help, comprises:
    determining a different GUI control impacted by a change of state for the GUI control associated with the help event; and,
    visually coupling the different GUI control with the GUI control associated with the help event through pointing help.

8. The method of claim 7, further comprising:
    further determining yet another GUI control in the GUI impacted by a change of state in the different GUI control; and,
    visually coupling the yet another GUI control with the different GUI control through pointing help.

9. A computer data processing system configured for pointing help in a supported graphical user interface (GUI), the system comprising:
    an application GUI provided by an application executing in a host computing platform with at least one processor and memory;
    a plurality of GUI controls; and,
    pointing help visually rendered in the GUI in a separate window superimposed over the application GUI visually coupling with an image in the form of an arrow, a selected one of the GUI controls to one of a statically positioned help message in the application GUI and another of the GUI controls impacted by a state change in the selected one of the GUI controls;
    wherein receiving a help event in association with a GUI control in the GUI, comprises receiving a help event selected from the group consisting of a mouse over event, a mouse down event, selection event, caret insertion event, and a help keystroke event.

10. The system of claim 9, wherein the pointing help is an arrow shell.

11. A computer program product comprising a non-transitory computer usable medium embodying computer usable program code for pointing help in a graphical user interface (GUI), the computer program product comprising:
    computer usable program code for receiving a help event in association with a GUI control in the GUI;
    computer usable program code for generating a help message for placement in a portion of the GUI statically configured to present different help messages; and,
    computer usable program code for visually coupling the GUI control with the help message through pointing help visually rendered in the GUI separately from the help message and the GUI control and comprising an image in the form of an arrow;
    wherein the computer usable program code for receiving a help event in association with a GUI control in the GUI, comprises computer usable program code for receiving a help event selected from the group consisting of a mouse over event, a mouse down event, selection event, caret insertion event, and a help keystroke event.

12. The computer program product of claim 11, wherein the computer usable program code for receiving a help event in association with a GUI control in the GUI, comprises computer usable program code for receiving a system-generated help event.

13. The computer program product of claim 11, wherein the computer usable program code for generating a help message for placement in a portion of the GUI statically configured to present different help messages, comprises computer usable program code for generating a help message for placement in a message bar portion of the GUI statically configured to present all help messages for the GUI.

14. The computer program product of claim 11, wherein the computer usable program code for visually coupling the GUI control with the help message through pointing help, comprises:
 computer usable program code for generating an arrow shell in a window separate from the GUI; and,
 computer usable program code for superimposing the arrow shell over the GUI to visually couple the GUI control with the help message.

15. The computer program product of claim 14, wherein the computer usable program code for superimposing the arrow shell over the GUI to visually couple the GUI control with the help message, comprises computer usable program code for superimposing the arrow shell over the GUI to visually couple the GUI control with the help message with an arc of the arrow shell exceeding bounds for the GUI while remaining within a display area for a device displaying the GUI.

16. The computer program product of claim 14, wherein the computer usable program code for superimposing the arrow shell over the GUI to visually couple the GUI control with the help message, comprises computer usable program code for superimposing the arrow shell over the GUI to visually couple the GUI control with the help message with an arc of the arrow shell being within bounds for the GUI.

17. The computer program product of claim 11, wherein the computer usable program code for visually coupling the GUI control with the help message through pointing help, comprises:
 computer usable program code for determining a different GUI control impacted by a change of state for the GUI control associated with the help event; and,
 computer usable program code for visually coupling the different GUI control with the GUI control associated with the help event through pointing help.

18. The computer program product of claim 17, further comprising:
 computer usable program code for further determining yet another GUI control in the GUI impacted by a change of state in the different GUI control; and,
 computer usable program code for visually coupling the yet another GUI control with the different GUI control through pointing help.

* * * * *